Aug. 4, 1931.                E. J. JONAS                1,817,081
            AUTOMATIC SLACK ADJUSTER FOR BRAKE RIGGING
                    Original Filed Feb. 22, 1929
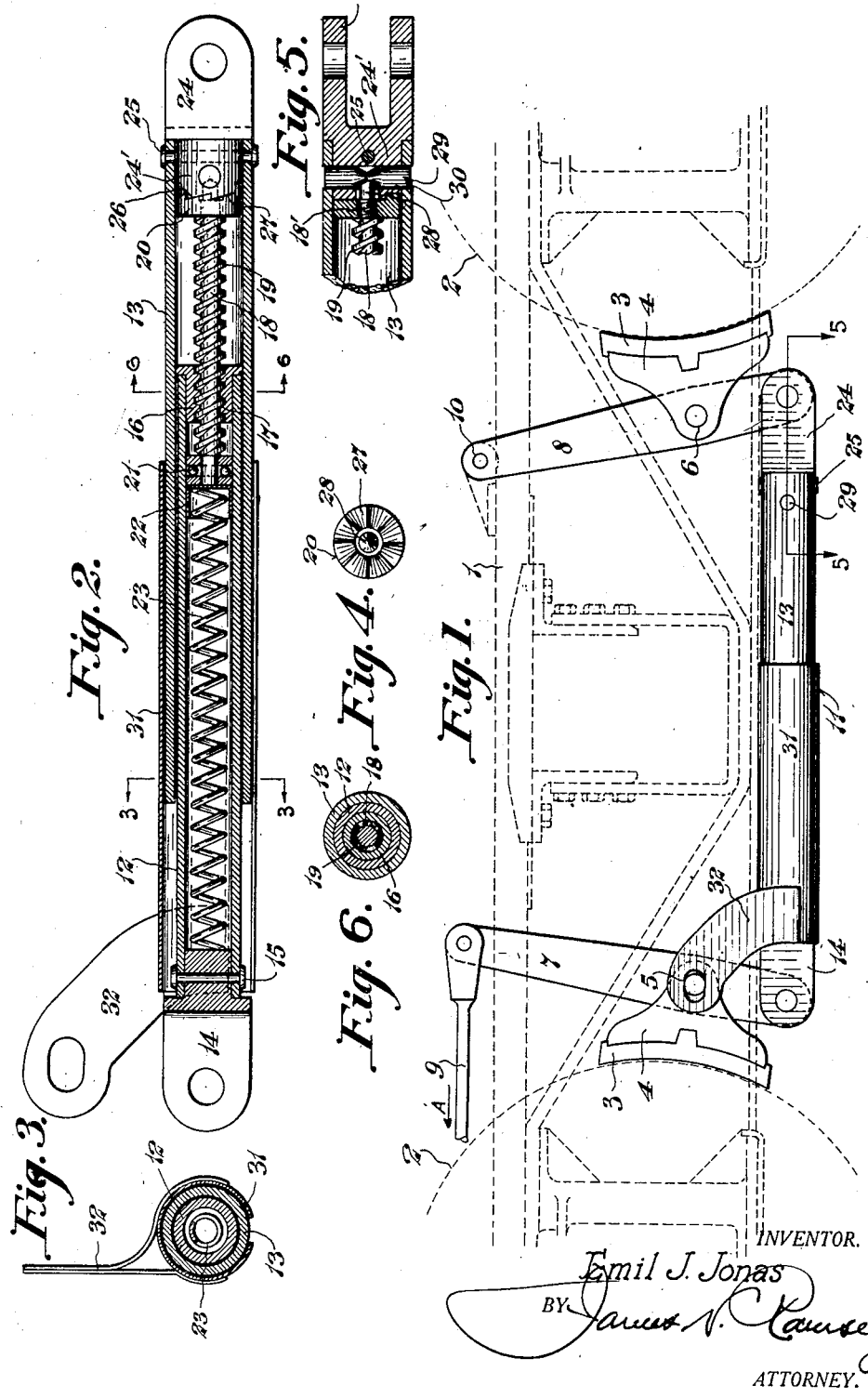
INVENTOR.
Emil J. Jonas
BY James V. Ramsey
ATTORNEY.

Patented Aug. 4, 1931

1,817,081

UNITED STATES PATENT OFFICE

EMIL J. JONAS, OF CINCINNATI, OHIO

AUTOMATIC SLACK ADJUSTER FOR BRAKE RIGGING

Application filed February 22, 1929, Serial No. 341,860. Renewed November 28, 1930.

This invention relates to improvements in slack adjusters and more particularly to automatic slack adjusters adapted to be used in connection with the truck brake rigging of street cars, although, of course, it is to be understood that certain features thereof are applicable to other types of brake rigging aside from that shown in the drawings.

The objects of the present invention are to provide an automatic slack adjuster for brake rigging which is simple, efficient, economical to manufacture, the operating parts of which are entirely enclosed and can be kept thoroughly lubricated at all times; an adjuster that automatically provides the necessary brake shoe clearance; and an adjuster that weighs less than one-half of any of the present slack adjusters, without sacrificing strength or efficiency.

Another object of this invention is to provide an automatic slack adjuster of simple construction which cannot be tampered with or improperly adjusted.

Still another object of the present invention is to so construct a slack adjuster of the screw type which cannot fail in service in such a manner as to allow the brakes to fail.

Other objects and advantages to be hereinafter pointed out are attained by that certain novel construction and arrangement of parts illustrated in the drawings in which I have shown the preferred embodiment of my invention.

In the drawings:

Fig. 1 is a side elevational view showing such parts of a truck and associated brake rigging as is necessary to understand the present invention;

Fig. 2 is a vertical longitudinal section of the invention, parts appearing in elevation;

Fig. 3 is a cross section taken on the line 3—3 of Fig. 2 and looking in the direction of the arrows;

Fig. 4 is an end view of one of the clutch members;

Fig. 5 is a fragmentary section on the line 5—5 of Fig. 1, parts appearing in elevation; and Fig. 6 is a cross section on the line 6—6 of Fig. 2.

In the embodiment of my invention as illustrated and which shows a preferred construction 1 designates a truck framework of the usual construction, which is of the four wheel type, and having wheels 2—2 on each side adapted to be engaged by brake shoes 3 in the well-known manner.

These brake shoes are carried by brake heads 4 pivotally connected at 5 and 6 to live and dead levers 7 and 8, respectively. The upper end of live lever 7 is connected by means of pull rod 9 with any suitable source of power, while the upper end of dead lever 8 is pivotally mounted at 10 to the framework 1.

The aforementioned parts are all of the usual and well-known construction, my invention however residing only in the member 11, pivotally connected between the lower ends of the live lever 7 and dead lever 8. This member 11 comprises a two part telescopic push rod and its purpose is to automatically take up the slack between the lower ends of the live and dead levers due to wear in the shoes and other parts.

Referring now to the member 11 in detail, and more particularly to Fig. 2, 12 designates an elongated tubular member which is telescopically received within elongated tubular member 13. The outer end of tubular member 12 is closed by a bifurcated link 14, the stud end of which is securely fixed within the end of said member 12 by a rivet pin 15. The inner end of tubular member 12 receives a sleeve 16, which is held therein by a "forced fit" and is provided with a threaded hole 17 extending lengthwise therethrough.

A screw 18, provided on its outer periphery with threads 19 of great pitch, is adapted to be received by threaded hole 17 in plug 16, one end of said screw having a clutch member 20 fixed thereon and the other end being rotatably received by ball bearing 21 slidably carried within tubular member 12. Cup 22 abuts with bearing 21 and receives one end of expansion spring 23, the other end of which spring bears against the inner surface of the stub end of bifurcated link 14.

The outer end of tubular member 13 is closed by bifurcated link 24, the stud end 24′ of which is securely fixed within the end of said member 13 in any suitable manner as, for example, by rivet pin 25. The innermost surface of the stud end 24' of link 24 is provided with clutch teeth 26, which teeth are adapted to register and mesh with clutch teeth 27 of clutch member 20.

In the drawings clutch member 20 is shown fixed to screw 18 by threads 18' and the end of said screw terminates in reduced stem 28, the end of said stem being pointed to engage with the reduced portion of pin 29. Said pin 29 is received by transverse hole 30 in the stud end 24' of bifurcated links 24 and is normally held therein by the pressure of stem 28, as will be explained more fully under operation of the device.

31 designates a split sleeve which is adapted to frictionally embrace and engage the outer periphery of tubular member 13, said sleeve being provided with an arm 32 pivotally connected at 5 to live lever 7, as shown in Fig. 1.

In operation, when the upper end of live lever 7 (pivoted at 5) is pulled towards the left in the direction of the arrow A by pull rod 9, the lower end of said live lever moves towards the right and, through the member 11, coacts with the lower end of dead lever 8 to carry the brake shoes 3 into engagement with the peripheries of the wheels 2. After the shoes 3 become worn to such an extent as to allow an excessive clearance between the wheels and said shoes the member 11 is automatically lengthened in the following manner: When the brakes are released the pull rod 9 and live lever 7 return to the inoperative position (as shown in Fig. 1), at which time the split sleeve 31 will have a tendency to move the tubular member 13 outwardly upon tubular member 12, thereby causing the disengagement of clutch teeth 26 from clutch teeth 27 and allowing the clutch member 20 to be partially rotated by screw 18 due to the pressure of expansion spring 23 until the member 11 has been lengthened a sufficient distance to take up the slack between live lever 7 and dead lever 8, whereupon the teeth 26 of clutch member 20 will again be engaged with the teeth 27 of stud end 24' of bifurcated link 24. When there is no need for lengthening the member 11 the split sleeve 31 merely slides over the outer periphery of tubular member 13, its action against said tubular member being only necessary during the slack take-up period. This take-up means, represented by the spring 23, screw 18, and clutch member 20, automatically acts whenever the shoes 3 become sufficiently worn to permit the separation of clutch teeth 26 from clutch teeth 27 and continues to act until the brake shoes 3 are entirely worn out. Then, to apply new shoes the clutch member 20 may be disengaged from the stub end 24' of bifurcated link 24 in order to collapse the member 11. To do this all that is necessary for the operator to do is to insert any convenient tool upon one end of pin 29 and drive said pin inwardly a sufficient distance to force the reduced stem 28 (of screw 18) outwardly a sufficient distance to disengage clutch teeth 26 from the clutch teeth 27 at which time the tubular member 12 may be pushed within tubular member 13 against the pressure of expansion spring 23. The entire available space within tubular members 12 and 13 can be filled with grease or oil to thoroughly lubricate the working parts carried within said members, which lubricant will protect all of said working parts, and, due to the construction of said members and working parts, foreign matter, such as dirt, dust, etc., will be prevented from coming into contact with said working parts and, therefore, the operation of lengthening the member 11 can be automatically taken care of whenever necessary and under all conditions.

I have found that friction sleeve 31 in some installations in my improved slack adjuster, may be omitted without affecting the proper functioning of this device. The reason for this is that in such installations the lag, drag, or inertia inherent in the dead lever and its connected parts is sufficient to over-balance the frictional resistance existing between the telescopic members 12 and 13.

An advantage of this invention is that the working parts are fully enclosed within the tubular members 12 and 13, respectively, and that no hand adjustment is necessary once the member 11 has been pivotally connected to the lower end of live lever 7 and dead lever 8, respectively.

It is believed that the above will so fully reveal the gist of the present invention that others can, by applying current knowledge, readily adapt the same to various uses and modifications without departing from the scope or spirit of the invention as defined by the claims.

What I claim as new and desire to secure by Letters Patent is:

1. An automatic slack adjuster for brake mechanism comprising a two part telescopic push rod, means within said push rod to permit lengthening and to prevent collapse thereof, said means comprising a spring, a feed screw, a rotatable clutch member carried by said screw, a stationary clutch member carried by said rod, an arm, a split sleeve attached to said arm, and frictionally mounted upon said rod for disengaging said clutch during the slack take-up period.

2. An automatic slack adjuster for brake mechanism, said mechanism having live and dead levers, a two part telescopic push rod comprising an elongated hollow member, one end of which is pivotally attached to said live lever, a second elongated hollow member, one end of which is pivotally attached to said dead lever, and which telescopically receives said first-mentioned hollow member, a two part clutch mounted within said last mentioned hollow member, a feed screw, a spring nested within said first-mentioned hollow member and adapted to normally hold said two part clutch in meshed engagement through said screw, and means frictionally engaging said second-mentioned hollow member and pivotally attached to said live lever to disengage said two part clutch, for the purpose of lengthening said push rod.

3. A push rod for brake mechanism having, in combination, live and dead levers, a hollow tubular member connected to one of said levers, a hollow tubular member connected to the other of said levers and telescopically associated with said first-mentioned member, and means carried within said hollow members adapted to permit relative movement of the members outwardly and prevent relative collapse thereof, for the purposes specified.

4. An automatic slack adjuster for brake mechanism having, in combination, live and dead levers, a hollow two-part tubular telescopic push rod connecting said levers, a permanent take-up and holding means located within said rod and including a two-part clutch, a feed screw, a spring acting upon said feed screw tending to move it relative to the rod and a friction operating arm for progressively moving said take-up and holding means as the brake shoe or wheel wear occurs to thereby insure uniform brake shoe clearance.

5. In an automatic slack adjuster for brake mechanism, in combination, live and dead levers, a two part telescopic push rod, a permanent take-up and holding means within said rod comprising a two part clutch and a feed screw co-acting with one of said parts, means acting upon the screw for holding said clutch parts in engaged relation, means for temporarily disengaging said clutch during the slack take-up period, and means for positively disengaging said clutch so the adjuster can be collapsed to permit application of new brake shoes.

6. An automatic slack adjuster for brake mechanism having live and dead levers comprising a tubular telescopic push rod, a permanent take-up and holding means located within said hollow rod and including a clutch, a feed screw, a spring and friction means for moving said take-up and holding means as the brake shoe or wheel wear occurs to thereby insure uniform brake shoe clearance, said friction means comprising a member having a yielding frictional engagement with the outer periphery of the push rod and movably connected to said live lever.

7. In an automatic slack adjuster for brake mechanism, in combination, live and dead levers, a telescopic push rod comprising an elongated hollow member, one end of which is pivotally attached to one of said levers, a second elongated hollow member, one end of which is pivotally attached to the other of said levers and which telescopically receives said first-mentioned hollow member, a clutch having a plurality of parts mounted within said second-mentioned hollow member, a feed screw and a spring nested within said first-mentioned hollow member and adapted to normally hold said clutch parts in meshed engagement through said screw, means in frictionally yielding engagement with said second-mentioned hollow member and pivotally attached to said live lever to temporarily disengage said clutch parts during the slack take-up period, and means for positively disengaging said clutch so the adjuster can be collapsed to permit application of new brake shoes.

8. In an automatic slack adjuster having a clutch and feed screw, means for positively disengaging said clutch comprising a pin reduced between its ends, said reduced portion adapted to normally receive the outer end of said feed screw when said clutch is engaged, said pin adapted to be moved outwardly to force the end of said feed screw away from said pin, thereby separating said clutch, for the purposes specified.

9. An automatic slack adjuster for brake mechanism, having in combination, live and dead levers, a two part telescopic push rod comprising an elongated hollow member, one end of which is attached to one of said levers, a second elongated hollow member, one end of which is attached to the other of said levers, and which is telescopically associated with said first-mentioned hollow member, a two part clutch mounted within said second mentioned hollow member, a feed screw and a spring nested within said first-mentioned hollow member and adapted to normally hold said two part clutch in meshed engagement through said screw and prevent the collapse of said rod.

10. An automatic slack adjuster for brake mechanism having, in combination, live and dead levers, a two part push rod comprising an elongated member one end of which is pivotally attached to said live lever, a second elongated member one end of which is pivotally attached to said dead lever, a feed screw, a two part clutch one part of which is carried by said feed screw and the other part of which is fixed to one of said elongated members and a spring acting upon said screw to normally hold the parts of said two part clutch in meshed engagement.

11. In an automatic slack adjuster for brake riggings, in combination, a live lever and a dead lever, an extensible rod comprising a pair of hollow telescopic members connected between the said levers against relative rotation, a toothed clutch member mounted in one telescopic member against relative rotation thereto, a rotatable and longitudinally movable toothed clutch member to co-operate with the other clutch member and non-rotatable whenever in toothed engagement with said other clutch member, mechanism mounted in the other telescopic member and constantly acting to simultaneously advance and rotate the rotatable clutch member and advance it towards and into co-operative relation with the nonrotatable clutch member, the clutch members rotatable relative to each other only when disengaged and adjusting mechanism acting to move the telescopic members to extend the rod during the slack take-up period to adjust the rod for wear in the brake.

12. In an automatic slack adjuster for brake rigging, in combination, brake levers, a two-part telescopic push-rod connecting the levers, mechanism within said push-rod to permit lengthening and to prevent shortening thereof and comprising a feed screw and a nut therefor, a spring acting upon said screw and tending to advance the screw relative to the nut, a rotatable clutch member carried by said screw, a stationary clutch member carried by said rod and co-acting with said rotatable clutch member and adjustable means exterior of said rod to effect the lengthening of the rod to take up wear in the brake rigging.

13. In an automatic slack adjuster for brake mechanism in combination, a two part telescopic push-rod, means within the rod to permanently extend and hold said parts comprising a screw rotatable and longitudinally movable relative to one telescopic part, a two part clutch having one part secured to the screw to rotate therewith and the other part secured to one telescopic part and non-rotatable relative to the screw and yielding means acting upon the screw and constantly urging the clutch part thereon into engagement with the other clutch part.

14. In an automatic slack adjuster comprising, in combination, a live lever, a dead lever, an automatically extensible and adjustable push-rod connecting said levers, the rod comprising a pair of telescopically associated tubular members having means at their exposed ends to connect to said levers, a toothed clutch member secured to one telescopic member against rotation, a threaded member secured to the other telescopic member against rotation and longitudinal movement, a screw mounted in the threaded member and co-acting with the threads thereof, a toothed clutch member secured to one end of the screw to rotate therewith and to co-act with the first clutch member and means constantly acting upon the screw tending to advance it relative to the threaded member and in the direction of the non-rotatable clutch member.

15. An automatic slack adjuster for brake rigging comprising, a power lever, a two-part telescopic push-rod, means within said push-rod to permit lengthening and to prevent collapse thereof, said means comprising a screw, a spring acting upon said screw, a rotatable clutch member carried by said screw, a stationary clutch member carried by said rod co-acting with said rotatable clutch member, an arm connected to said power lever and means attached to said arm and having frictional yielding engagement with the said rod for disengaging said clutch during the slack take-up period.

16. An automatic slack adjuster for brake mechanism, in combination, live and dead levers, a two-part telescopic push-rod comprising an elongated hollow member, one end of which is pivotally attached to one of said levers, a second elongated hollow member, one end of which is pivotally attached to the other of said levers, and which telescopically receives one end of said first-mentioned hollow member, a two-part clutch mounted within said second-mentioned hollow member, a feed screw and a spring nested within said first-mentioned hollow member and adapted to normally hold the parts of said two-part clutch in meshed engagement through end pressure upon said screw and means having a yielding frictional engagement with said second-mentioned hollow member and attached to one of said levers to disengage the parts of said two-part clutch, for the purpose of lengthening said push-rod.

EMIL J. JONAS.